Feb. 4, 1936.  M. JACOB  2,029,776

CASH REGISTER

Filed Nov. 5, 1930  12 Sheets-Sheet 2

Fig.1<sup>c</sup>

Fig.8<sup>b</sup>.

Fig.8<sup>c</sup>

Fig.15.

Inventor:
Max Jacot
By Marks & Clerk
Attys.

Feb. 4, 1936.  M. JACOB  2,029,776
CASH REGISTER
Filed Nov. 5, 1930  12 Sheets-Sheet 6

Inventor:
Max Jacob
By Marks & Clerk
attys.

Feb. 4, 1936. M. JACOB 2,029,776
CASH REGISTER
Filed Nov. 5, 1930 12 Sheets-Sheet 9

Feb. 4, 1936.  M. JACOB  2,029,776
CASH REGISTER
Filed Nov. 5, 1930  12 Sheets-Sheet 11

Inventor:
Max Jacob
By Marko Olerk
Attys.

Patented Feb. 4, 1936

2,029,776

UNITED STATES PATENT OFFICE 2,029,776

CASH REGISTER

Max Jacob, Bielefeld, Germany, assignor to firm Anker-Werke Aktiengesellschaft, Bielefeld, Germany Application November 5, 1930, Serial No. 493,674

7 Claims. (Cl. 235—6)

This invention relates to cash registers and book-keeping machines, several adding mechanisms, and a total lever manually manipulative to control the machine for registering and adding amounts also for reading and clearing the totals.

As is well known, in certain types of calculating machines for computing customers' balances and ascertaining the results of such computations, a set of racks are arranged behind one another in a vertical plane to correspond to the units, tens and other denominations.

The principal object of this invention is to provide simplified adding mechanisms embodying racks arranged substantially horizontally side by side as packets for each denomination and divided into superposed groups, the racks coming into direct engagement with intermediate adding mechanism.

Another object of the invention is to provide a machine of such simple character that the parts may be assembled in a comparatively small space. A further object is to eliminate intermediate special connections between the racks and intermediate adding mechanisms and play incident to the use of such connections.

According to this invention there is associated with each group of racks a frame slidable transversely thereof and having rocking members which can be adjusted relatively to the racks of each adding mechanism to push those racks which have been operated from zero position back into said position.

With these and incidental objects in view, the invention consists of certain novel features of construction and combinations of parts, the essential elements of which are set forth in the appended claims, and a preferred embodiment of which is hereinafter described with reference to the drawings which accompany and form part of this specification.

In said drawings:—

Fig. 12 shows the controlling and operating mechanism for the totalizer racks.

Fig. 12a is a top plan view of the parts shown in Fig. 12.

Figs. 12b and 12c show details of Figs. 12 and 12a.

Fig. 14 shows a perspective front view of the tie bar for the adding racks.

The drawings show only those parts which are necessary to understand the invention, and only the co-operation of these parts is described. All those parts which do not belong to the invention have been omitted to avoid confusion by illustration of unessential parts.

The machine shown in the drawings is provided with five sets of totalizer lines, each line comprising nine totalizers, so that there are forty-five totalizers in the machine. These five sets are arranged one under the other on tie bars. Instead of adding wheels the value storing members consist of racks, and nine of these racks are arranged, in packets, for each set. A number of these packets may be arranged in the machine, side by side, according to the adding capacity desired.

Nine racks of one totalizer line comprising one rack of the same number in each packet form a value storing device. The adjusting and transferring mechanism is common to all value storing devices of one totalizer line.

Figure 3:
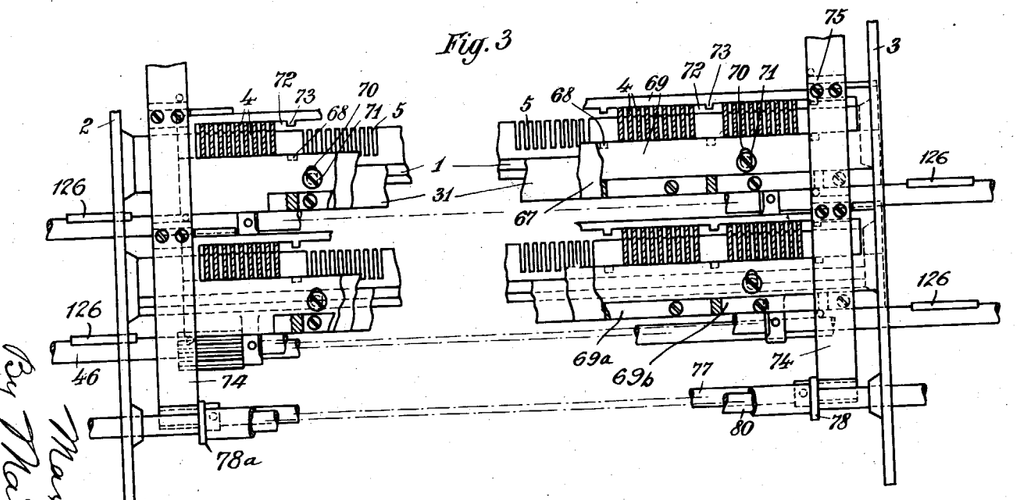
Fig. 3 is a section taken alongside the tie bars for the totalizer racks.

In a tie bar 1 of each line of totalizers, (Figs. 1 and 3) suitably supported between the frames 2 and 3, racks 4 are slidably disposed in slots 5 provided in said bar. The racks 4 are each provided with a guiding slot 6 through which passes a bolt 7 suitably fastened to the tie bar 1. Because of this arrangement the racks 4 are mounted for both sliding and swinging movement to different positions the bolt 7 forming a pivot therefor and limiting their sliding movement. At one end the racks 4 are provided with teeth 8 and 9 on their upper and lower edges respectively. A tie bar 10, suitably secured to the frames 2 and 3, and provided with a toothed section 11 for engagement with the teeth 8, arrests movement of the racks 4 in their different positions.

Figures 1, 1A, 1B:
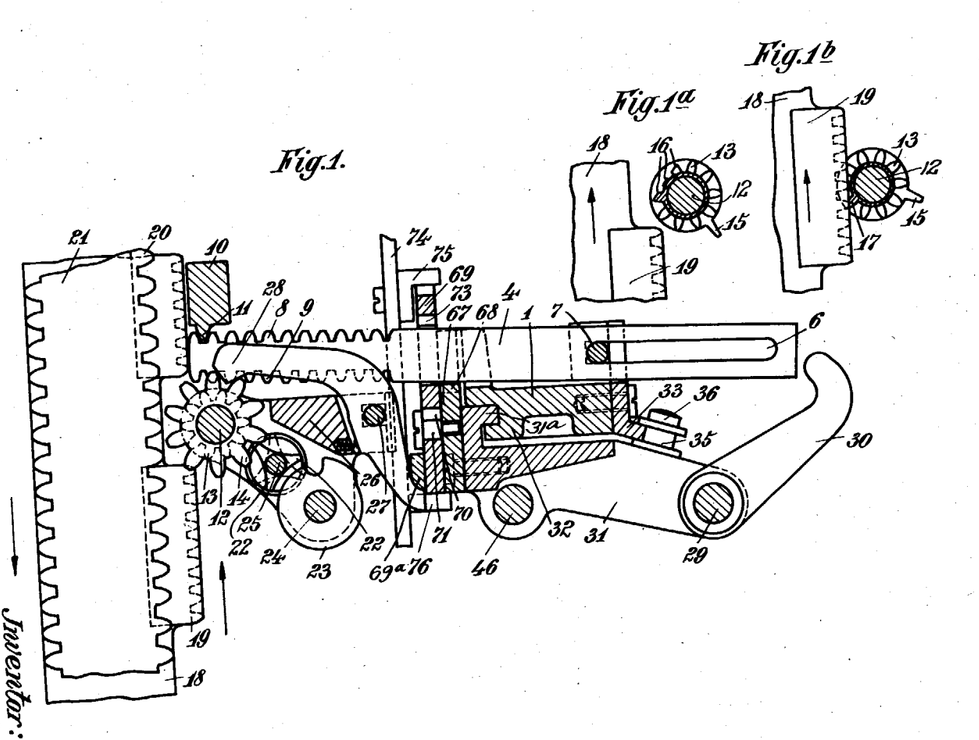
Fig. 1 shows a cross section through one adding mechanism.
Figs. 1a and 1b together are views of details of Fig. 1.
Figure 1C:
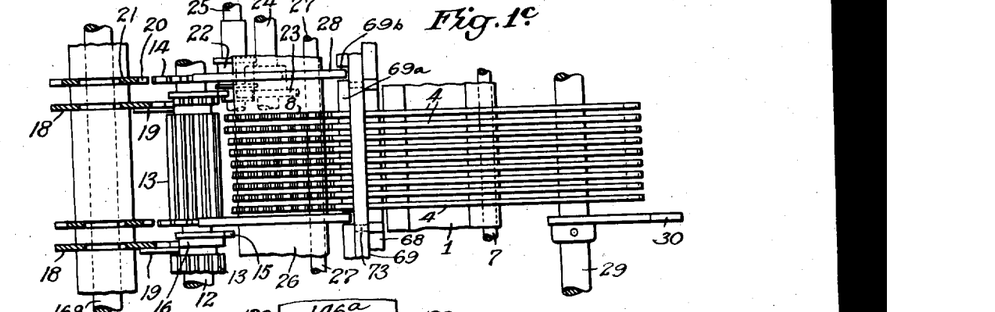
Fig. 1c is a top plan view of a unit of nine racks.
Figure 2:
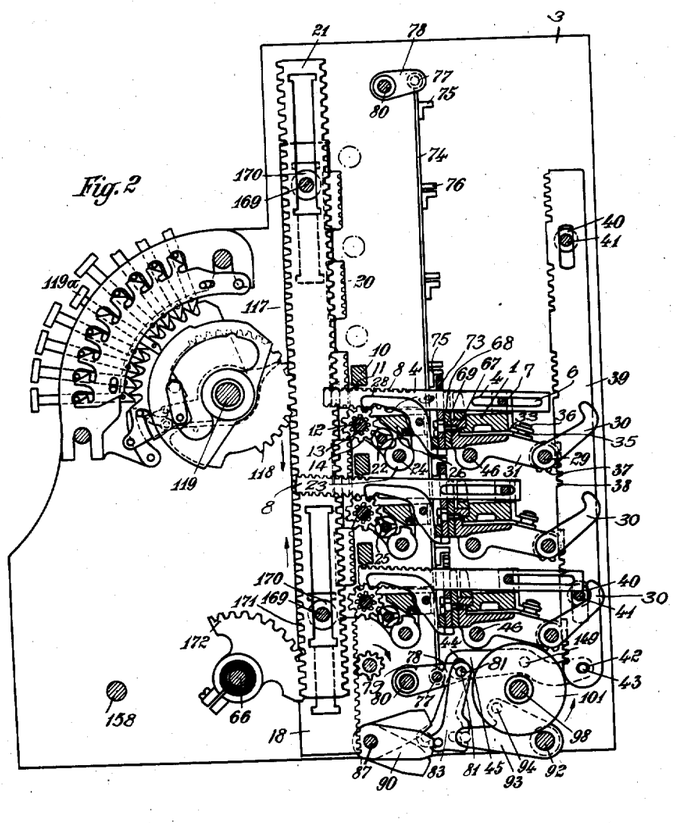
Fig. 2 is a cross section through the whole mechanism and shows the differential actuating mechanism for the key bank and adding mechanisms.

The racks 4 represent certain values according to their positions. In their position shown in Fig. 1 they represent the value 9 and if they are in their extreme opposite position they represent zero. If they are in the position as shown in Figure 1 they constitute the number 9, and if they are moved to the left as far as possible they constitute the number 0 (zero). Auxiliary adding pinions 13 are rotatably but non-slidably arranged on shafts 12. Pinions 13 are of such width that each rack of one packet constituting a decimal order can be moved into engagement with the pinion corresponding to this packet. On one side of the pinions 13 gears 14 are fitted and on the other side there are cams 15. The gears 14 cooperate in adding operations with the teeth 20 of the racks 21 which are slidably mounted for vertical movement on rods 169 arranged on the frames 2 and 3. The pinions 13 are mutilated in different manner in two planes which cooperate as hereinafter described with the racks 18 as well as with the plates 19. The plates 19 are fastened to the racks 18 which are slidable in a vertical direction on rods 169 suitably secured to the frames 2 and 3. In the plane of the racks 18 three of the teeth of the pinions 13 are cut off in the zero position of the pinions 13 so that recesses 16 are formed (Fig. 1a). That plane of the pinions 13 which works in connection with the plates 19 consists of one tooth 17 only which lies in the zero position of the pinions 13 on the edge of the plate 19 (Fig. 1b). In order to effect the tens-transfer of the pinions 13 transfer members 22 are rotatably supported on a fixed bolt 25 (Figs. 1 and 2). These transfer members 22 consist of 2 three-toothed wheels. One of these three-toothed wheels 22 works in connection with the cams 15 and 23 and the other with gear 14 of the next higher unit.

Figures 4, 13:
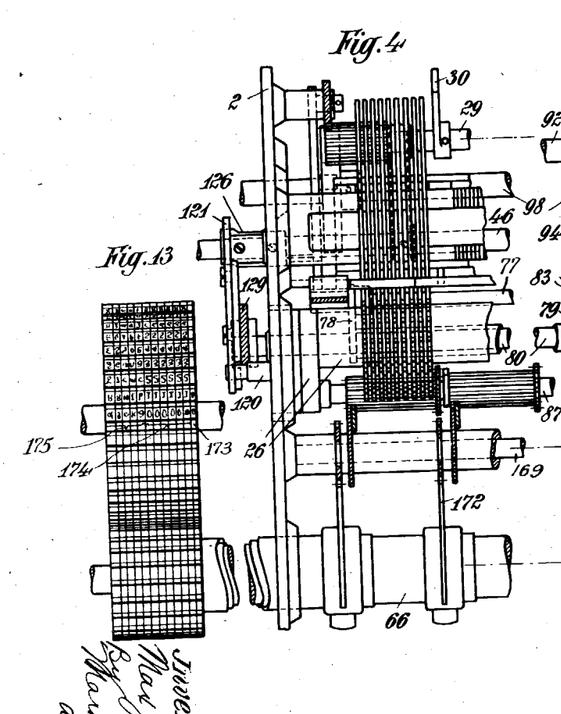
Figs. 4 and 4a together are a top plan view of the adding mechanism and transferring mechanism for the type wheels.
Fig. 13 shows a top plan view of the type wheels.
Figures 4A, 5:
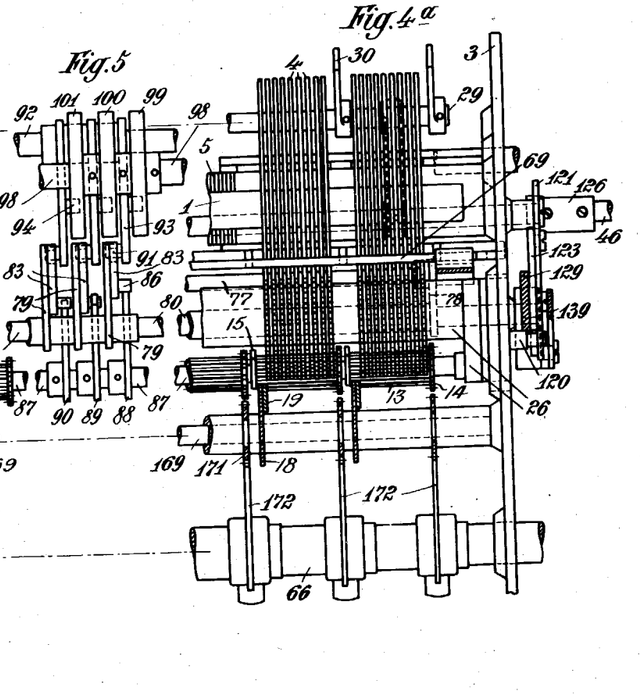
Fig. 5 shows the arrangement of the cams by means of which the adding operation of the machine and also the reading and clearing of the totals are controlled.
Figure 8:
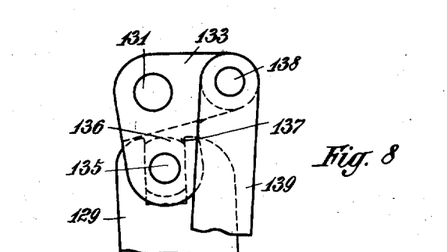
Figs. 8 and 8a show the controlling and coupling mechanisms for one set of totalizers only.
Figure 8A:
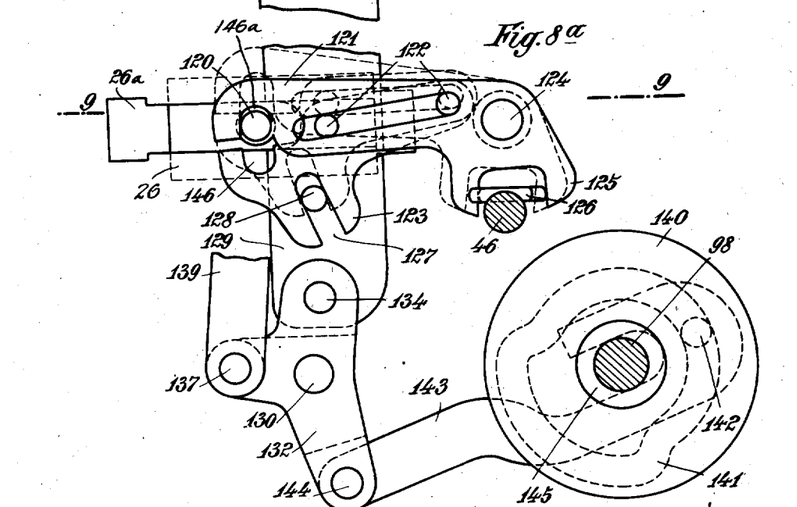
Figure 9:
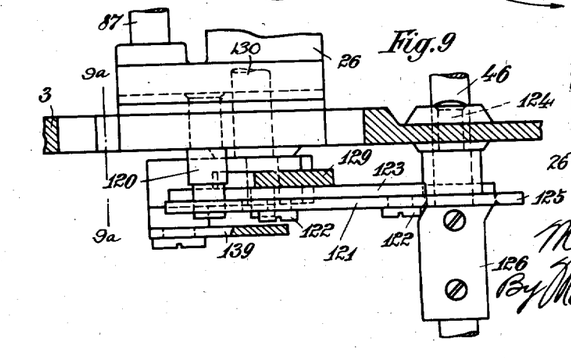
Fig. 9 is a top plan view of the parts shown in Fig. 8a on line 9—9 of the latter figure.
Figure 9A:
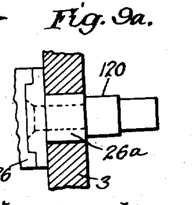
Fig. 9a is a section on line 9a—9a of Fig. 9.

The cams 23 are secured to the shaft 24. The shafts 12 and 24 as well as the bolts 25 are supported in frames 26 which are slidably guided in horizontal slots 26a (Figs. 8a, 9 and 9a) of the side frames 2 and 3 (Figs. 4 and 4a).

For each adding pinion 13 there is provided a spring operated pawl 28, which pawls are pivoted on bolts 27 of the frames 26. One arm of each pawl 28 cooperates with the gear 14 of its associated pinion 13 and arrests the latter in any of its positions. The other arm of each pawl 28 cooperates with a projection 69a of a plate 69 (Fig. 1) as hereinafter described.

For each packet consisting of 9 racks 4 an arm 30 is provided which is secured to a shaft 29. The shafts 29 are rotatable but not slidable in parts 31. The parts 31 have a projection 31a which is slidably guided by projection 32 on one side of tie bar 1. On the other side of this tie bar there is fastened a guiding ledge 33 on which run anti-friction rollers 35, rotatable on studs 36 fixed on parts 31.

Figures 12, 12B:
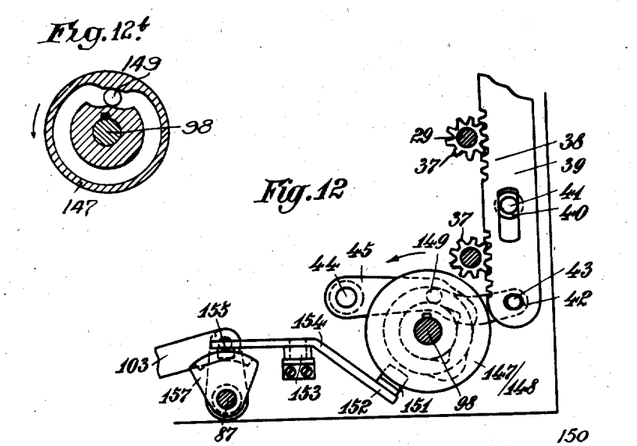
Figures 12A, 12C, 14:
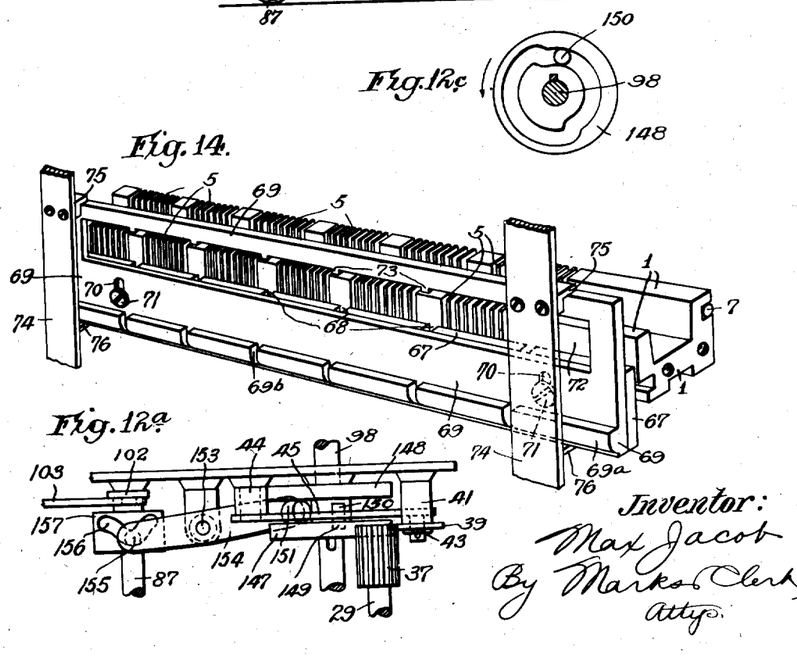
Figure 15:
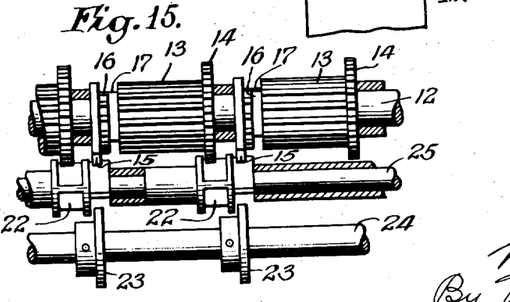
Fig. 15 is a top plan view of a part of the adding mechanism.

The shafts 29 are fitted with broad pinions 37 (see Figs. 2, 12 and 12a) which cooperate with teeth 38 of the rack 39. The rack 39 can be moved vertically upon parts 40 of bolts 41 and is provided at its lower end with an elongated hole 42 in which a bolt 43 of a lever 45 engages. The lever 45 is rotatably fitted on a stud 44 and carries anti-friction rollers 149 and 150 which cooperate with pitman cams 147—148. The cams 147—148 are slidably but non-rotatably mounted on the main shaft 98 (Fig. 12a).

Figures 6, 16:
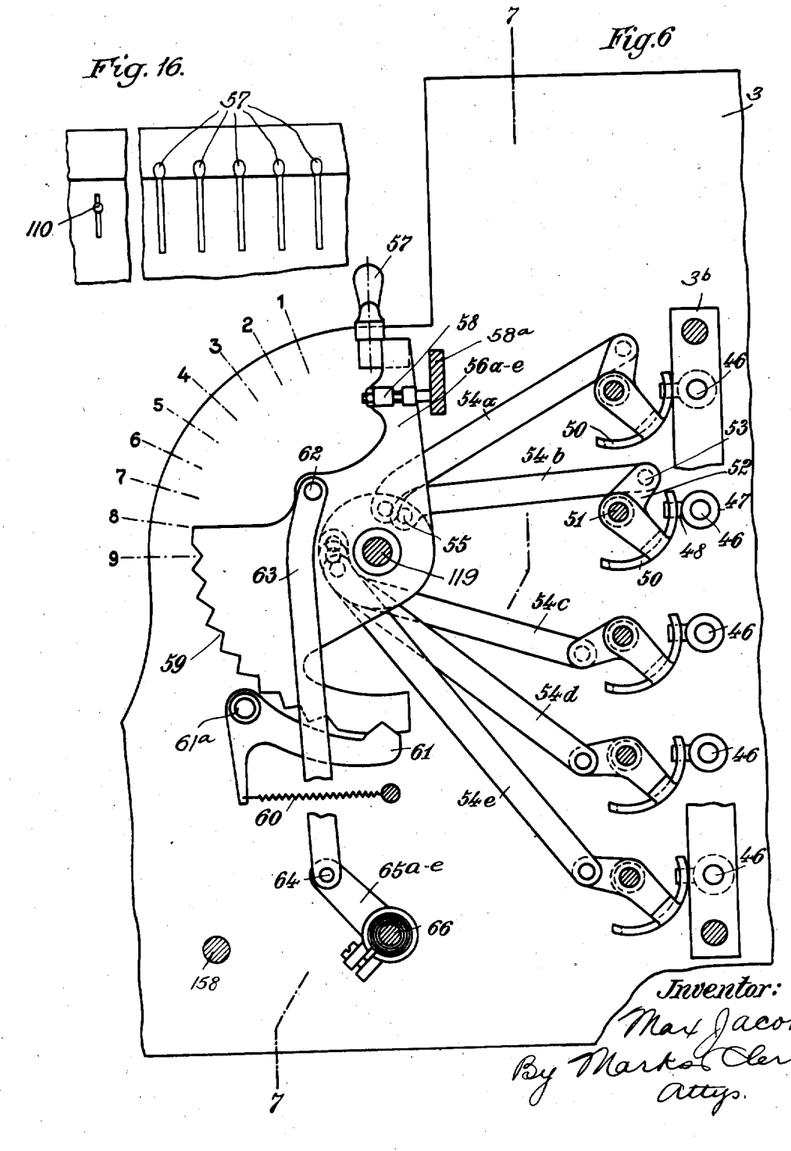
Fig. 6 is a sectional view of the adjusting mechanism for the totalizers taken on line 6—6 of Fig. 7.
Fig. 16 is a front view of the setting levers.
Figures 6A, 6B:
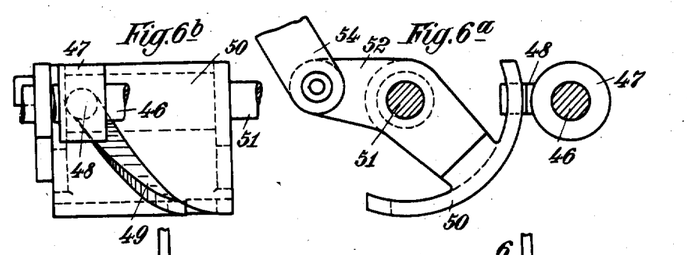
Figs. 6a and 6b are detail views of the parts shown in Fig. 6.
Figure 7:
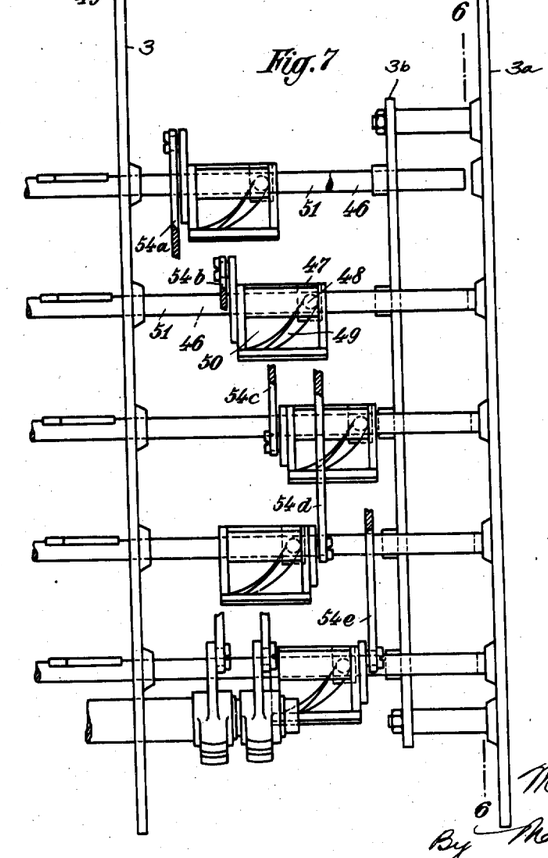
Fig. 7 shows a front section of the adjusting mechanism for the totalizers taken on line 7—7 of Fig. 6.

The rods 46 (see Figs. 6 and 7) are fixed on the said parts 31 and slidably guided in the plate 3b (Fig. 6). Moreover, the said rods are provided with fixed collars 47 which bear anti-friction rollers 48. The rollers 48 engage the spiral slots 49 of parts 50. These parts are rotatably but not slidably mounted on bolts 51 and fitted with arms 52. By means of the connecting rods 54a and studs 53 and 55 these arms are movably connected with the levers 56a to 56e for selecting the totalizers. The amount keys 119a (Fig. 2) are arranged between the total lever 110 and the total-selecting levers 56a—56e (Fig. 16).

The levers 56a—e are rotatably fitted on the shaft 119. There are knobs 57 for adjusting them. In the normal zero position of the levers 56a—e adjustable stops 58 thereon engage the plate 58a which is fixed between the side frames 3 and 3a (Fig. 6).

The levers 56a—e are provided with notches 59 which engage pawls 61 being rotatably fitted on the rod 61a (Fig. 6). The rod 61a is fixed in the frames 3 and 3a. The pawls 61 are operated by springs 60. By the aid of studs 62 and 64 also of the connecting rods 63 the levers 56a—e are connected with arms 65a—e. The arms 65a—e are secured to tubes 66 bearing type wheels 175 at their other end.

Figure 2A:
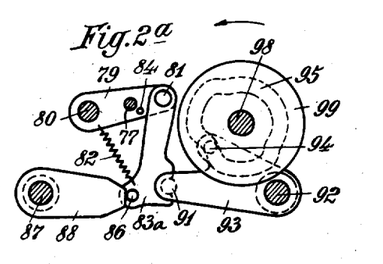
Figs. 2a—2b—2c show control mechanism for adding amounts also for reading and clearing the totals.
Figure 2B:
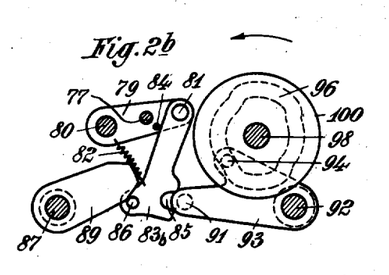
Figure 2C:
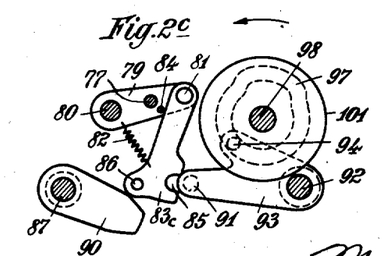
Figure 10:
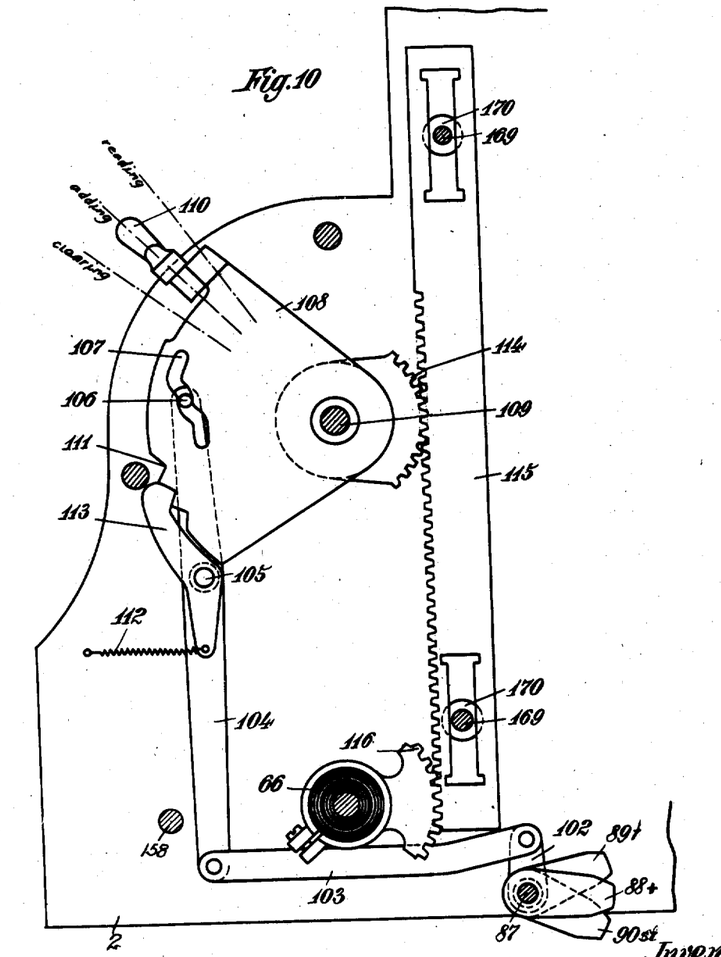
Fig. 10 is a cross section and shows the control mechanism for adding the amounts and for reading and clearing the totalizers.

Mounted on the slidable bearing members 31 (Figs. 1 and 3) are plates 67 which are provided with slots 68 (Fig. 14). The plates 67 are provided with studs 71 on which, by means of elongated slots 70 thereon, plates 69 are slidably mounted for vertical movement. The plates 69 are provided with apertures 72 therein through which the racks 4 pass. Said plates 69 have a projection 69a thereon with slots 69b therein for a purpose presently seen. Opposite to the slots 68 of the plates 67 projections 73 are provided on the plates 69. For vertically moving the plates 69 two rods 74 are disposed at opposite ends thereof. The rods 74 are provided with projections 75 and 76 between which the plates 69 are guided in horizontal direction. The rods 74 (Fig. 2) are pivotally mounted on bolts 77 upon levers 78 and 78a fixed on shafts 80. The shafts 80 are rotatably mounted in the side frames 2 and 3. On the lower shaft 80 are fixed three levers 79 (Figs. 2 and 5) on which, by means of bolts 81, coupling parts 83 are pivoted (Figs. 2a—2c). The parts 83 are subject to the action of springs 82 (Figs. 2a—2c) and carry at their lower end studs 86 and slotted lugs 85. The levers 79 are fitted with pins 84 acting as stops for the coupling parts 83. Cams 88, 89 and 90 are fixed on the shaft 87 and cooperate with the studs 86. The slotted lugs 85 engage studs 91 of the levers 93 rotatably mounted on a bolt 92. The bolt 92 is secured to the side frames 2 and 3. The levers 93 have mounted thereon anti-friction rollers 94 which engage cam races 95, 96 and 97 formed in three pitman cams 99, 100 and 101 fixed on the main shaft 98. At the left hand end of the shaft 87 there is secured a lever 102 associated with the lever 104 by means of a link 103 (Fig. 10). The lever 104 is rotatably mounted pivoted on a bolt 105 and is provided at its upper end with an anti-friction roller 106 which engages a race 107 of the segment 108. The segment 108 which is adapted to determine the kind of operation of the machine is rotatably mounted on the shaft 119 and fitted with a knob 110 for adjusting purposes. The said segment is also provided with notches 111 which engage the pawl 113 being rotatably mounted on the bolt 105. The pawl 113 is subject to the action of a spring 112. On one side of the segment 108 there is fixed a toothed segment 114 which engages the rack 115. The rack 115 is guided in a vertical direction by slots 170 and bolts 169 secured to the frames 2 and 3. In its lower section the rack 115 engages toothed segment 116 fitted to a tube 66 for adjusting the type wheel 173.

The parts 88, 89, 90, 87, 103, 104 and 108 operate in the following manner: When the knob 110 of the segment 108 is in the adding position (Fig. 10), the cam 88 positions the coupling parts 83 belonging to the pitman cam 99, against the spring 82, viz. into the position as shown in Fig. 2a, whereas the two other coupling parts 83 are in the position as shown in Figs. 2b and 2c. In this position the coupling parts 83 rest on the pins 84. When the knob 110 is in the reading position the cam 90 positions the coupling part 83 pertaining to the pitman cam 100 into the position as shown in Fig. 2a, whereas the coupling parts 83 of the cams 99 and 101 are in the position as shown in Figs. 2b and 2c. When the knob 110 is in the clearing position, the cam 89 positions the coupling parts of the cam 101 into the position as shown in Fig. 2a whereas the two coupling parts 83 for the cams 99 and 100 are in the position as shown in Figs. 2b and 2c.

The teeth 117 of the racks 21 engage the toothed segments 118 rotatably mounted on shaft 119. The segments 118 form part of a differential mechanism which is influenced by the keys 119a. The differential mechanism is generally known and described in the German Patent 181,-791 and for this reason there is no necessity of giving an exact description of same. It is only shown in Fig. 2.

For the purpose of moving the gears 14 into engagement with the teeth 20 of the racks 21 the following device is provided. On both sides of the frames 26 are fitted pins 120 (Figs. 4 and 4a) protruding on both sides through the frames 2 and 3. The pins 120 cooperate with the clutch levers 121 on which plates 123 are slidably supported (Figs. 8, 8a, 8b, 8c and 9) by pins 122 in a slot of the levers 121. The clutch levers 121 are rotatably mounted on studs 124 fixed in the side frames 2 and 3. The lower forked arm 125 of the clutch lever 121 operates in connection with the cam plates 126 fastened on the rods 46 (Figs. 4, 4a, 8a and 9). The anti-friction roller 48 at the other end of the rod 46 operates in connection with the spiral slots 49 of the parts 50 as above explained.

Figure 8B:
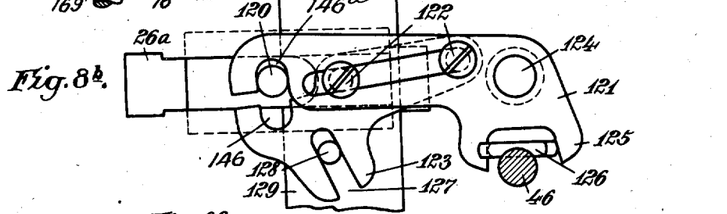
Figs. 8b and 8c together are detail views of Fig. 8a including the controlling and coupling parts in different positions.
Figure 8C:
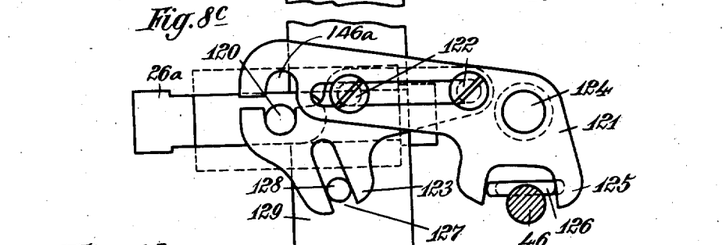

When the rod 46 is moved out of its normal position the cam plates 126 on both sides cooperate with the forked arms 125 of the clutch levers 121 and move same from the position of Figure 8b into the position of Fig. 8c.

The slidable plates 123 are provided with slotted lugs 127 cooperating with pins 128 on the plates 129. The plates 129 are pivoted at their lower ends by studs 134 on two three armed levers 132. The levers 132 are secured to a shaft 130 journalled in the side frames 2 and 3. A connecting rod 139 connects the levers 132 with the two armed lever 133 by means of studs 137 and 138. The said levers 133 are fixed to a shaft 131 journalled in the side frames 2 and 3. The downwardly directed arm of this lever 133 carries a stud 135 with a guiding part 136. The slotted lug 137 of the plates 129 engages the guiding part 136. The pitman 143 which is associated with the three armed lever 132 by a stud 144 is guided at its other end on the main shaft 98 and carries an anti-friction roller 142 engaging the cam race 141 of the pitman cam 140. By means of the mechanism above described the plates 129 and the pins 128 are moved horizontally. The mechanism above described is arranged on both frames 2 and 3. Only the pitman 143 and the pitman cam 140 is on one side. The transmission of the movement to the levers 132 and 133 is effected by the shafts 130 and 131 to which they are secured.

The control mechanism for the cams 148 and 149 moving the racks 4 into their zero position by means of the parts 45, 39, 30, 37 and 29 as above described operates in the following manner. Between the two cams 148 and 149 operates an anti-friction roller 151 secured to the double arm 154 (Figs. 12 and 12a). The arm 154 is rotatable on a stud 153 fixed in the side frame 2. The other arm of part 154 is provided with an anti-friction roller 155 which cooperates with a cam race of the part 157 fastened on a shaft 87. The shaft 87 is operated by the parts 102, 103, 104, 106 and 107 as above explained (Fig. 10). When the knob 110 of the segment 108 is in the adding position, the pitman cam 147 engages the anti-friction roller 149. In the event of the aforesaid knob 110 being in the reading or clearing position the pitman cam 148 engages the anti-friction roller 150.

Shortly before the machine operation is finished it is necessary to move all the auxiliary adding pinions 13 back into their zero position. This is effected in the following way: The adding pinions 13 are provided with recesses 16 as already described. This section of the pinions 13 works in connection with the teeth of the rack 18. On the lower side of the rack 18 there are teeth 168 with which mesh pinions 167 (Fig. 11a) secured to the shaft 166. The shaft 166 is journalled in the side frames 2 and 3. On one end of the shaft 166 there is fixed a pinion 165. The pinion 165 meshes with the teeth 164 of segment 162 turnably pivoted on a stud 163. The arm extending downwards and belonging to the segment 162 is provided with an anti-friction roller 161 which engages a cam race 160 of the pitman cam 159 fixed on the shaft 158.

Figure 11:
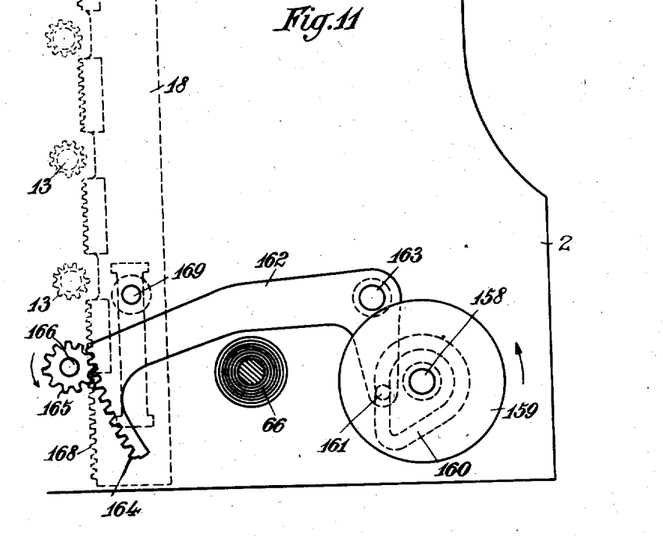
Fig. 11 is a view of the mechanism for resetting the auxiliary adding members of the totalizers.

When operating the machine the shaft 158 makes one revolution in the direction as shown in Fig. 11. Shortly before the revolution is finished the cam race 169 of the pitman cam 159 swings the segment 162 up and down. By means of the pinion 165, the shaft 166, the pinions 167 and the teeth 168 all the racks 18 make the same up and down movement. During the upward movement of the racks 18 the teeth of same operate in the plane 16 of the pinions 13 and turn the latter pinions back to their zero position until the teeth 17 engage the plates 19. During the downward movement the racks 18 are ineffective upon the pinions 13.

The parts of the machine work in the following manner:

(1) *The operation of the machine for adding amounts*

When the knob 110 of the segment 108 is in the adding position, the amount keys can be pressed in. The totalizers on which the amounts are to be added are adjusted by the knobs 57. Only one totalizer in each of the five sets consisting each of 9 totalizers may be operated in one operation of the machine. When the knob 110 is in the adding position, the lever 93 pertaining to the pitman cam 99 is coupled with lever 79 by means of the coupling part 83a (Figs 2 and 2a). Also the pitman cam 147 engages the anti-friction roller 149 of the lever 45 (Figs. 12 and 12a). Both mechanisms have already been described.

If for instance one of the knobs 57 is placed into a position for adding the amounts on a totalizer, the movement of the segment 56a is transferred by the connecting rod 54a to the spiral slot 49 of the part 50 (Fig. 6). This spiral slot 49 moves the anti-friction roller 48 and together with same the corresponding rod 46 to the left into the position shown in Fig. 7. Owing to this movement the cam plates 126 actuate the clutch levers 121 in such a way that the slotted lugs 146 engage the studs 120 of the frame 26 (Fig. 8c) on both sides of the machine. The other clutch levers 121 and their plates 123 corresponding to the selecting levers 56a—e not moved from their original position remain in their normal position with the result that the slotted lug 146a engages the studs 120 of the frames 26 and prevent in this way a movement of the frames 26 (Fig. 8b).

The rod 46 moves the parts 31 and together with same the plates 67, 69 and the arms 30. All the notches 68 in plate 67 as well as all the projections 73 of plate 69 are placed opposite to those racks which belong to the selected totalizer.

By means of the rod 63 connecting the lever 56a with the arm 65a the movement of the knob 57 is transferred to the corresponding tubes 66 with the result that the symbol of the selected sub-total on the type wheel 175 is moved into printing position. (Fig. 6).

The symbol showing that the machine is in adding operation is moved in the following way. When the knob 110 is in the adding position the segment 114 adjusts segment 116 by the aid of rack 115 with the result that by means of a tube 66 the corresponding symbol of the type wheel 173 is moved into printing position (Fig. 10).

On operating the machine the shaft 119 makes a swinging movement in a well known manner and the main shaft 98 makes one revolution as previously described. At the beginning of the revolution of the main shaft 98 the pitman cam 99 operates its corresponding lever 93 by means of the cam race 96, and the lever 97 participates in this movement owing to the coupling part 83. The slotted lug 85 of part 83 is in engagement with stud 91 as previously described. By the shafts 80 and the levers 78a the movement of the lever 79 is transferred to the two rods 74 (Fig. 2). All the plates 69 participate in this movement. By means of their projections the plates 69 rock the racks 4 of the selected totalizer downwards with the result that the teeth 9 engage the pinions 13. All the other racks 4 remain in their normal position owing to the plates 67. Only the selected racks 4 can be operated by their plate 69 as the slots 68 of the plate 67 admit this movement (Figs. 1 and 2).

Thereupon the cam race 149 of the pitman cam 147 operates the lever 45 in upward direction (Fig. 12). This movement is transferred by the parts 39, 37 and 29 to all the arms 30. The arms 30 move the selected racks 4 to the left hand side as viewed in Figs. 1 and 2. In the normal position of the machine all the pinions 13 are in their zero position. Owing to the above explained movement of the racks 4, therefore, the pinions 13 are turned from their zero position according to the position of the racks 4.

At the same time when the adjustment of the pinions 13 takes place the differential actuating mechanism on the shaft 119 moves all the racks 21 into their uppermost position by means of segments 118 (Fig. 2).

Thereupon by the aid of the parts 93, 83, 79, 80, 74 and 78 the cam race 95 moves the plates 69 into top position. Owing to this movement the racks 4 of the selected totalizer are rocked upwards (Figs. 2 and 2a). The teeth 9 leave the pinions 13 and the teeth 8 engage the projection 11 of the tie bar 10 and arrest these racks 4 in their zero position (Fig. 2).

After the racks 4 have been arrested the cam race 141 moves the pitman 143 by the aid of the anti-friction rollers 142. Consequently the two plates 129 arranged on both sides of the frames 2 and 3 are operated by the parts 132, 130, 139, 133, 131 (Fig. 8). The studs 128 of the plates 129 thereby move the plates 123. Only the two plates 123 which pertain to the selected totalizer-line and which have been engaged with the studs 120 (Fig. 8c) of the corresponding frame 26 move the latter in such a way that the gears 14 engage the teeth 20 of the racks 21. All the other plates participate in the movement of the plates 129. However, this movement is without any effect upon the studs 120 of the other frames 26 owing to the fact that the studs 120 are arrested by the slotted lugs 146a of the coupling lever 121 and not in engagement with the plates 123.

After the gears 14 have been moved into engagement with the teeth 20 of the racks 21, the shaft 119 rocks in the other direction and the differential actuating mechanism displaces the racks 21 in accordance with the amount keys 119a pressed in the gears 14 and the pinions 13 being displaced according to the values of said amount keys.

Thereupon by means of the parts 143, 132, 130, 139, 131, 129, 123, 120 the cam race 141 moves the frame 26 belonging to the selected totalizer-line in such a way that the gears 14 are disengaged from the teeth 20 of the racks 21 (Figs. 8a and 2).

If during the transmission of the amounts to the gears 14 one of the gears reaches or exceeds a complete revolution the cam 15 of the corresponding pinion 13 places the corresponding transfer member 22 in such a position that the same cooperates with the cam 23 of the shaft 24. For this reason the shaft 24 pertaining to the selected totalizer-line must not be turned while the registered amounts are transferred as previously explained.

During the revolution of the shaft 24 the aforesaid transfer member 22 is turned by its corresponding cam 23. The other section of the transfer member 22 cooperates with the gear 24 of the next higher unit and adds 1.

Thereupon the cam race 95 operates the lever 93 and moves the racks 4 into engagement with the pinions 13 by means of the parts 83, 79, 80, 74 and 69.

Figure 11A:
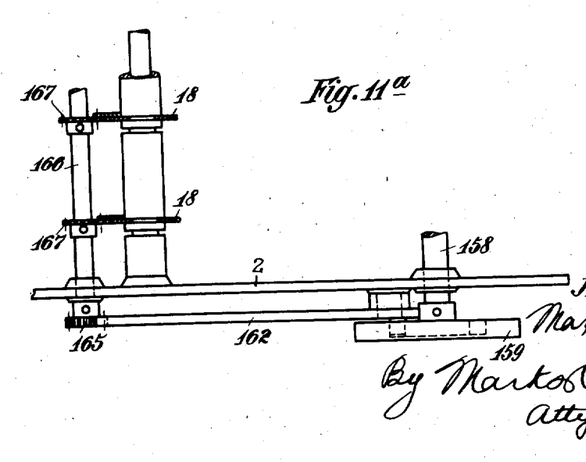
Fig. 11a shows a fragmentary top plan view of the parts of Fig. 11.

At the same time the cam race of the pitman cam 147 moves the lever 45 into its normal position (Figs. 12 and 12a) with the result that also all the arms 30 are turned into their normal position. The arms 30 pertaining to the selected totalizer-line release the corresponding racks 4 (Figs. 1 and 2). After that, the cam race 160 moves the toothed segment 162 upwards and turns the pinion 165. By means of the shaft 166 and the pinions 167, the racks 18 are moved upwards (Figs. 11 and 11a). During this movement the teeth of the racks 18 work against that section 16 of the pinions 13 which is shown in Fig. 1a. All the pinions 13 which, as previously described, have been moved out of their normal position, are turned until the tooth 17 engages the plate 19. In this position of the pinions 13 the teeth of the racks 18 do not influence the pinions 13. Owing to the aforesaid turning movement of the pinions 13 the racks 4 having been meshed with the pinions 13 are moved in correspondence with backward turning of the pinions 13 as above explained.

During the operation of the racks 18 for returning the pinions 13 into their zero position as previously described the pawls 28 of the selected totalizer are disengaged from the gears 14 by the aid of the projection 69a which cooperates with the downwardly extending arms of the pawls 28.

The pawls 28 of the remaining totalizer-lines which have not been adjusted are not disengaged from their corresponding gears 14 owing to the fact that the projections 69a of the plates 69 are provided with slots 69b (Fig. 14) which are in line in the normal position of the plates 69. Owing to the direct adjustment by the adjusting levers 56, the normal position of the plates 69 also corresponds to the normal position of the adjusting levers 56.

The turning movement of the handle is now finished and the machine is again in normal position.

In this case the frame 26 and its parts 13, 14, 22, 23 etc. are to be considered as auxiliary adding and transferring mechanism for one set of nine rack totalizers.

(2) *The operation of the machine for reading the totalizers*

When the knob 110 is in the reading position the symbol type 175 is moved into printing position by means of parts 114, 115, 116 and 66. By means of the parts 104, 103, 102, 87, the cam 90 is moved into such a position that it slides the slotted lugs 85 of the coupling part 83 towards the stud 91 of the lever 93 belonging to the pitman cam 100. The parts 83 and 93 are in the position as shown in Fig. 2a while the other parts 83 and 93 pertaining to the cams 99 and 101 are in the position as shown in Figs. 2b and 2c.

When the shaft 87 is turned by the parts 102, 103, 104, the part 157 is also moved. The cam race 156 operates the lever 154 and moves the pitman cams 147 and 148 into such a position that the cam race of the pitman cam 147 is disengaged from the anti-friction roller 149 and that the cam race of the pitman cam 148 engages the anti-friction roller 150. The adjustment of the totalizer to be read is effected in the way already described in paragraph "The operation of the machine for adding amounts".

When the machine is operated, the racks 24 are moved into their zero position by means of the differential actuating mechanism on the shaft 118.

Thereupon the cam race operates the pitman 143 and the parts 132, 130, 139, 133, 129, 128, 123, 120 and 26 (Fig. 3) with the result that the gears 14 engage the racks 21 (Figs. 1 and 2).

After this operation the cam race 96 of the pitman cam 100 operates the corresponding lever 93, the parts 83, 79, 80, 74 and the plate 69 with the result that the racks 4 of the selected totalizer are moved into engagement with the pinions 13 and disengaged from the projection 11 of the tie bar 10.

After the racks 4 have engaged the pinions 13, the pitman cam 148 rocks the lever 45 and the rack 39 upwards and turns the pinions 37, the shaft 39 and the arms 30. The arms 30 move the selected racks 4 into the extreme left hand position (Figs. 1 and 2). The pinions 13 participate in this movement together with the gears 14, the racks 21, the segments 172 as well as the tubes 66 and turn the corresponding figures of the amount types 174 into printing position. The type wheels 174 are now adjusted so that they print the sum accumulated in the selected totalizer. The printing mechanism is the same as described in paragraph "The operation of the machine for adding amounts". The printing of the type wheels 173, 174 and 175 can be effected on a detail strip, on an issued ticket or on an inserted slip.

The segments 118 of the differential actuating mechanism participate in the said movement without any effect.

Thereupon the cam race 96 of the pitman cam 100 disengages the racks 4 from the pinions 13 and moves the aforesaid racks into engagement with the projection 11 of the tie bar 10 as above described.

After that the cam race 141 moves the pitman 143 in the opposite direction and disengages the gears 14 from the racks 21 by means of the parts 13, 139, 133, 129, 123, 128 and 26.

After the mechanism for turning the shafts 24 has operated as above described without any effect upon the corresponding parts, the cam race 96 in the above explained manner, moves the racks 4 of the selected totalizer into engagement with the pinions 13. The projections 69a of the plate 69 operate against the downwardly extending arm of the pawls 28 and disengage the pawls 28 from the gears 14. Thereupon the pitman cam 148 operates the lever 45 and moves the rack 39 downwards. The pinions 37, the shaft 29 (Figs. 12 and 12a) and the arms 30 (Figs. 1 and 2) release the selected racks 4. Coincidentally the cam race 160 of the pitman cam 159 moves the segment 162 upwards and turns the pinion 165, the shaft 166 as well as the pinions 167. The pinions 167 move the racks 18 upwards. The teeth of the racks 19 engage the section 16 of the pinions 13 and turn the pinions 13 back to their zero position under control of the teeth 17 engaging the plates 19. Thereafter the racks 18 return to their normal position without any effect upon the pinions 13. At the same time the cam race 69 disengages the racks 4 from the pinions 13 as above described and the racks 4 engage the projection 11 of the tie bar 10. The racks 4 of the selected totalizer are returned into the same position they occupied before the machine was operated. As will be seen the parts 13 and 14 may be considered as a driving gear between the racks 4 and the racks 21.

(3) The operation of the machine for clearing the totalizers

When the knob 110 is in the clearing position and when one of the totalizers is adjusted by the knob 57, the symbol type for clearing is turned into printing position by means of the parts 114, 115, 116, 66 and 173 (Fig. 10). By means of parts 104, 103, 102, 87 and 90 the coupling part 83 is moved into engagement with the stud 91 of the lever 93 belonging to the cam race 97 of the pitman cam 101 (Fig. 10). The coupling parts 83 for the other pitman cams 99 and 100 are disengaged from the studs 91 as shown in Figs. 2b and 2c.

The selection of the totalizer by means of the knob 57 and the adjustment of the corresponding type wheel is effected in the same way as previously explained in paragraph "The operation of the machine for adding amounts".

When the handle 193 is operated, the racks 24 are moved into their zero position by means of the differential actuating mechanism on the shaft 118 as previously described.

Thereupon the cam race 141 operates the pitman 143 and the parts 132, 130, 139, 133, 129, 128, 123, 120 and 26 (Fig. 8a) with the result that the gears 14 engage the racks 21 (Figs. 1 and 2). After this operation the cam race 97 of the pitman cam 101 operates the corresponding lever 93, the parts 83, 79, 80, 74 and the plate 69 with the result that the racks 4 of the selected totalizer are moved into engagement with the pinions 13 and disengaged from the projection 11 of the tie bar 10.

After the racks 4 have enaged the pinions 13, the pitman cam 148 rocks the lever 45 and the rack 39 upwards and turns the pinions 37, the shaft 39 and the arms 30. The arms 30 move the selected racks 4 into the extreme left hand position (Figs. 1 and 2). The pinions 13, the gears 14, the racks 21, the segments 172 as well as the tubes 66 are moved and turn the corresponding figures of the amount types 174 are brought into printing position. The type wheels 174 are now adjusted so that they print the sum accumulated in the selected totalizer. The printing mechanism is the same as described in paragraph "The operation of the machine for adding amounts". The printing of the type wheels 173, 174 and 175 may be effected on a detail strip, on an issued ticket or an inserted slip.

The segments 118 of the differential actuating mechanism are moved idly during movement of the parts just described.

The cam race 97 of the pitman cam 101 now disengages the racks 4 from the pinions 13 and moves the aforesaid racks into engagement with the projection 11 of the tie bar 10 as previously described.

Now the cam race 141 moves the pitman 143 in the opposite direction and disengages the gears 14 from the racks 21 by means of the parts 13, 139, 133, 129, 123, 128 and 26.

After the mechanism for turning the shafts 24 has operated without any effect upon the corresponding parts the pinions 37, the shaft 29 (Figs. 12 and 12a) and the arms 30 (Figs. 1 and 2) release the selected racks 4. Coincidentally the cam race 160 of the pitman cam 159 moves the segment 162 upwards and turns the pinion 165, the shaft 166 as well as the pinions 167. The pinions 167 move the racks 18 upwards. The teeth of the racks 19 engage the section 16 of the pinions 13 and turn the latter back to their zero position until the teeth 17 engage the plates 19. Thereafter the racks 18 return to their normal position without any effect upon the pinions 13. This movement of the pinions 13 is without any effect upon the racks 4. The racks 4 remain in their zero position and the selected totalizer is cleared.

What I claim is:—

1. In a machine of the class described, manually operated means for determining the kind of operation of the machine, a plurality of sets of value retaining devices comprising a plurality of racks divided into packets one for each denomination, a differential mechanism, an auxiliary adding mechanism adapted to mesh directly with said differential mechanism and with said racks, means to determine the time of engagement of said racks with said auxiliary adding mechanism, said last named means being controlled by said manually operated means.

2. A machine of the class described comprising a plurality of sets of value retaining devices constructed as toothed racks arranged approximately horizontally side by said and divided into packets for each denomination, a common auxiliary adding wheel for each packet adapted to directly engage any rack of said packet, means for adjusting said racks for adding, or clearing operations, and a differential mechanism for each denomination cooperating with said auxiliary adding wheel of each denomination.

3. In a cash register a plurality of sets of value retaining devices constructed as toothed racks arranged approximately horizontally side by side and divided into packets for each denomination, an auxiliary adding wheel for each packet adapted to directly engage any rack of its related packet, a frame carrying said auxiliary adding wheels, a differential mechanism for each packet, said frame being shiftable to move said auxiliary adding wheels into engagement with the differential mechanisms, means for selecting the racks forming one value retaining device, a second frame associated with said racks and displaceable transversely thereto, and driving members turnably mounted on said second frame, said second frame and said members being adjusted by said selecting means.

4. A cash register comprising a plurality of sets of value retaining devices constructed as toothed racks arranged approximately horizontally side by side and divided into packets for each denomination, an auxiliary adding wheel for each packet, a frame displaceable transversely to said racks to select a desired set of value retaining devices, means to move said racks into direct engagement with said adding wheels, said last named means being carried by said transversely displaceable frame and adapted to be moved downward in said frame when set by said frame over the racks of one set of value retaining devices.

5. A cash register as claimed in claim 4, characterized in that said means to move said racks into engagement with said adding wheels comprises a plate, locking means for said racks, said plate if moved downward swinging the racks of the selected value retaining device out of said locking means and into engagement with said adding wheels.

6. In a machine of the class described, a line of value retaining sets comprising a plurality of racks for each value retaining set, said racks being arranged in packets for each denomination, means for selecting racks forming one value retaining set, amount setting means, a differential mechanism differentially actuated according to the setting of said amount setting means, a frame carrying an auxiliary adding mechanism, said auxiliary adding mechanism comprising an auxiliary adding wheel and tens-transfer means for each packet, and means adapted to bring into direct engagement said auxiliary adding wheel with said differential mechanism and with said racks.

7. In a mechanism according to claim 6, driving means for said frame, said means for selecting the racks of one set coupling said frame to said driving means.

MAX JACOB.